(12) United States Patent
Browning et al.

(10) Patent No.: US 9,961,478 B2
(45) Date of Patent: May 1, 2018

(54) INTERNET OF THINGS ELECTRONIC SIGNAL AGGREGATOR AND REPEATER

(71) Applicant: Intel Corporation, Santa Clara, CA (US)

(72) Inventors: David W. Browning, Beaverton, OR (US); Kristoffer D. Fleming, Chandler, AZ (US); Robert E. Gough, Sherwood, OR (US); Guy G. Sotomayor, San Jose, CA (US); Vasudev Bibikar, Austin, TX (US); Ankush Varma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 14/450,482

(22) Filed: Aug. 4, 2014

(65) Prior Publication Data
US 2015/0381227 A1 Dec. 31, 2015

(51) Int. Cl.
*H04W 4/00* (2009.01)
*H04W 84/20* (2009.01)

(52) U.S. Cl.
CPC ............ *H04W 4/005* (2013.01); *H04W 84/20* (2013.01)

(58) Field of Classification Search
CPC ....... H04B 17/309; H04B 1/40; H04W 24/02; H04W 24/04; H04W 4/005; H04W 84/12; Y02E 60/122; Y10T 29/42; G08B 25/016; G08C 2201/93; H04L 67/12; H04M 11/04; H04Q 2209/10; H04Q 2209/43; H04Q 2209/88
See application file for complete search history.

(56) References Cited

U.S. PATENT DOCUMENTS

| | | | | |
|---|---|---|---|---|
| 4,259,548 A | * | 3/1981 | Fahey | H04M 11/04 340/506 |
| 6,135,970 A | * | 10/2000 | Kadhiresan | A61N 1/3702 600/595 |
| 9,271,170 B1 | * | 2/2016 | Loverich | H04W 24/02 |

(Continued)

FOREIGN PATENT DOCUMENTS

CN 103226029 A 7/2013

OTHER PUBLICATIONS

Taiwan Office Action & Search Report dated Jul. 26, 2017, in related Taiwan Application No. 104115907, 2 pages.

*Primary Examiner* — Philip Sobutka
(74) *Attorney, Agent, or Firm* — Schwabe, Williamson & Wyatt, P.C.

(57) ABSTRACT

The present disclosure is directed to logging random "chirps" of IoT devices and rebroadcasting these chirps to other devices on demand. An apparatus consistent with the present disclosure includes a transmitter to communicate with a network of wireless-communication-enabled devices. The apparatus also includes a receiver to detect communications transmitted from the wireless-communication-enabled device. Further, the apparatus includes control unit logic to tally the number of electrical signals emitted from each wireless-communication-enabled device. In addition, the apparatus includes memory to store the number of emitted electrical signals. The apparatus further includes a power unit electrically coupled to the transmitter, receiver, and memory.

20 Claims, 5 Drawing Sheets

(56) References Cited

U.S. PATENT DOCUMENTS

| | | | |
|---|---|---|---|
| 2005/0128067 A1* | 6/2005 | Zakrewski | G08B 29/20 340/511 |
| 2010/0271199 A1* | 10/2010 | Belov | G01M 5/0008 340/539.3 |
| 2012/0081057 A1* | 4/2012 | Schwamberger | H02J 9/002 318/478 |
| 2015/0142998 A1* | 5/2015 | Burtch | G06F 13/4221 710/72 |
| 2015/0353352 A1* | 12/2015 | Lee | H01L 41/1136 29/25.35 |
| 2016/0065722 A1* | 3/2016 | Rose | H04M 1/72569 370/338 |
| 2016/0080907 A1* | 3/2016 | Saleem | H04W 4/028 455/456.1 |

* cited by examiner

US 9,961,478 B2

INTERNET OF THINGS ELECTRONIC SIGNAL AGGREGATOR AND REPEATER

RELATED APPLICATION

The present application is a Non-Provisional application of U.S. application Ser. No. 61/998,580 filed Jun. 28, 2014, entitled "INTERNET OF THINGS ELECTRONIC SIGNAL AGGREGATOR AND REPEATER"

FIELD

This disclosure pertains to Internet of Things (IoT) systems, and in particular (but not exclusively) to logging random "chirps" of IoT devices and rebroadcasting these chirps to other devices on demand.

BRIEF DESCRIPTION OF THE DRAWINGS

To facilitate understanding, identical reference numerals have been used, where possible, to designate identical elements that are common to the drawings. The drawings are not to scale and the relative dimensions of various elements in the drawings are depicted schematically and not necessarily to scale. The techniques of the present disclosure may readily be understood by considering the following detailed description in conjunction with the accompanying drawings, in which.

DETAILED DESCRIPTION

A detailed description of some embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to some embodiments have not been described in detail to avoid unnecessarily obscuring the description.

The present disclosure is directed to logging random "chirps" of IoT devices and rebroadcasting these chirps to other devices on demand. An apparatus consistent with the present disclosure includes a transmitter to communicate with a network of wireless-communication-enabled devices. The apparatus also includes a receiver to detect communications transmitted from the wireless-communication-enabled device. Further, the apparatus includes control unit logic to tally the number of electrical signals emitted from each wireless-communication-enabled device. In addition, the apparatus includes memory to store the number of emitted electrical signals. The apparatus further includes a power unit electrically coupled to the transmitter, receiver, and memory.

Figure 1:
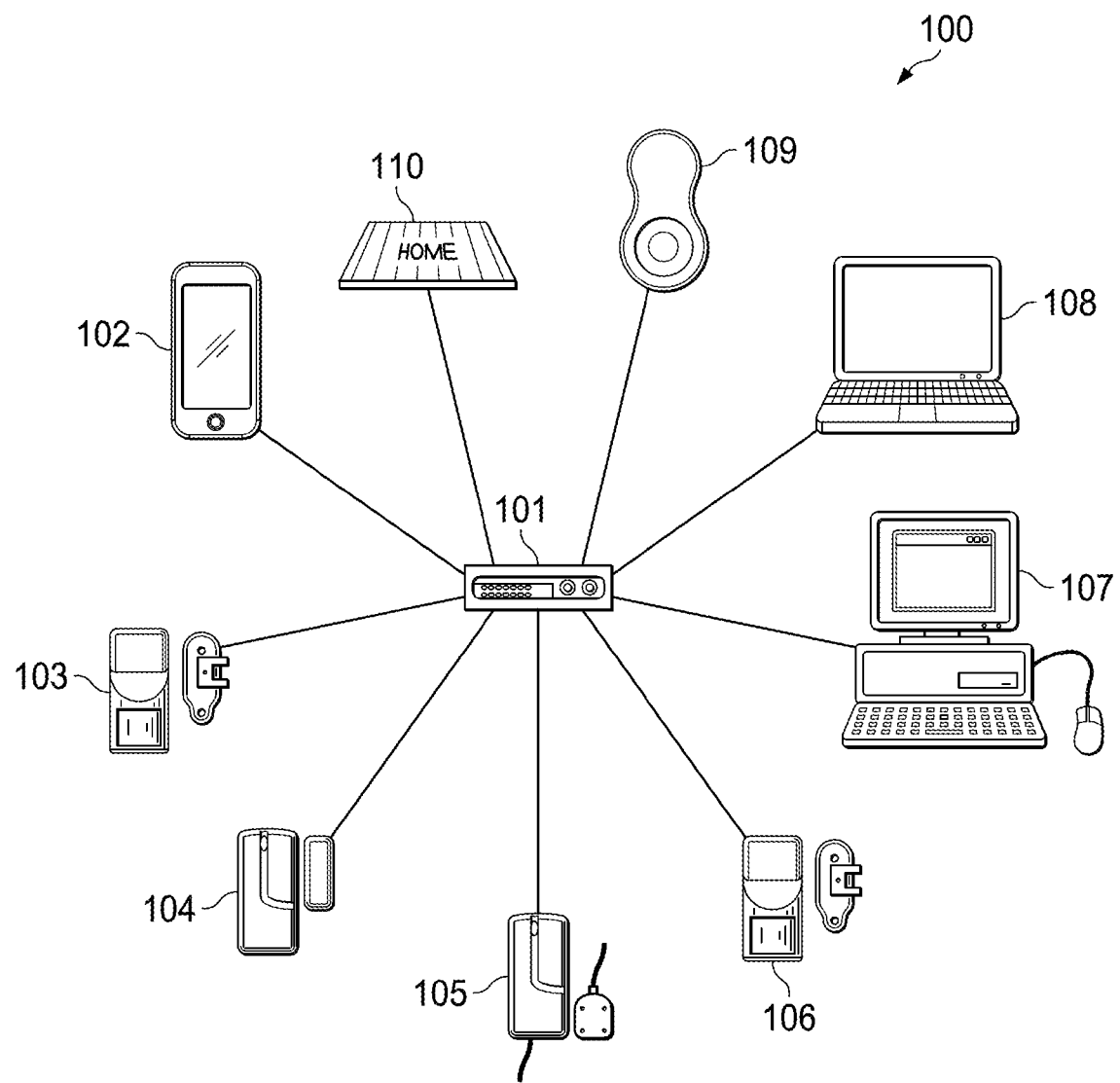
FIG. 1 is a diagram illustrating a network of wireless-communication-enable devices communicatively coupled to an aggregator device consistent with the present disclosure.

FIG. 1 is a diagram illustrating a network of wireless-communication-enabled devices 100 communicatively coupled to an aggregator device 101 consistent with the present disclosure. In particular, the figure shows a network of devices 100 wirelessly coupled to the aggregator device 101. In some embodiments, the various devices 100 includes sensors which may detect various forms of energy such as, but not limited to, vibration, motion, light, and thermal energy.

For instance, coupled to aggregator device 101 is mobile phone 102, motion sensor 103, window sensor 104, flooding sensor 105, wireless activity sensor 106, personal computer 107, laptop 108, driveway sensor 109, and floor mat sensor 110. It should be appreciated that any of various types of wireless-communication-enabled devices may be added and that the network of devices 100 is not limited to the devices 100 described above. As such, any device which is capable of emitting electrical signals upon detection of some event or according to a preset frequency that aggregator device 101 can detect is within the spirit and scope of the present disclosure.

Figure 2:
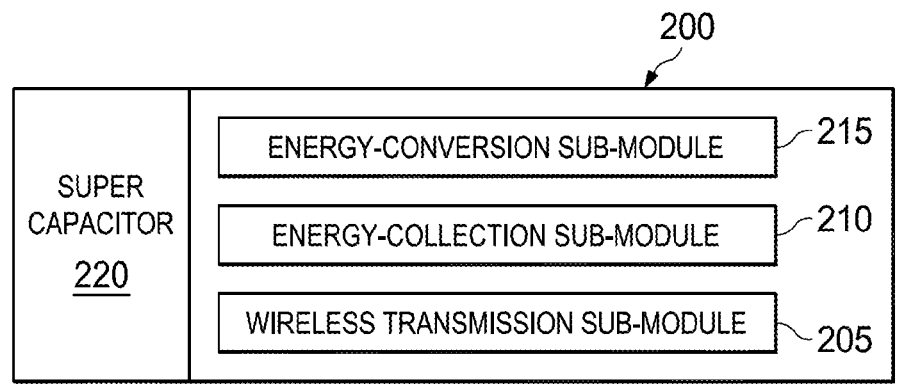
FIG. 2 is a block diagram representing a sensor consistent with the present disclosure.

FIG. 2 is a block diagram representing a sensor device 200 consistent with the present disclosure. As shown, in one or more implementations, sensor device 200 includes several sub-modules to effect energy collection, energy conversion, and wireless transmission. In the embodiment shown, sensor device 200 includes a wireless transmission sub-module 205, energy-collection sub-module 210, and energy-conversion sub-module 215.

Wireless transmission sub-module 205 may transmit electrical signals according to communicate information. In one embodiment, wireless transmission sub-module 205 transmits an electrical signal according to a predetermined frequency. For instance, by wireless transmission sub-module 205, sensor device 200 communicates with an aggregator device every 15 minutes, 30 minutes, 60 minutes, etcetera. The predetermined frequencies are not limited to the aforementioned examples. As such, the wireless transmission sub-module 205 may communicate with an aggregator device at any sufficient frequency based on the application.

For example, a sensor device 200 coupled to a floor mat in front of a person's doorway may monitor and record the amount of occurrences that the sensor device 200 detects someone approaches the person's home. The sensor device 200 may be configured, for instance, to transmit a unique signal at each hour (2:00 pm, 3:00 pm, 4:00 pm, etc.) to an aggregator device to indicate the number of occurrences that someone approached the person's doorway.

In another embodiment, wireless transmission sub-module 205 transmits an electrical signal, asynchronously, such as in response to an event. For instance, a sensor device 200 may be coupled to a window of a home. Upon detecting that the window is open, the sensor device 200 may be configured to immediately communicate (e.g., transmit a signal) to the aggregator device. The aggregator device may be on a wireless network which may communicate such occurrence to an alarm device such that law enforcement, a homeowner, and other interested parties are made aware of the incident.

In addition, sensor device 200 collects energy harvested by an energy-collection sub-module 210. One having ordinary skill in the art may appreciate that "energy harvesting" includes a process by which energy is derived from external sources such as, but not limited to, solar power, thermal energy, wind energy, salinity gradients, kinetic energy and various forms of ambient energy (e.g., from the human body). In some implementations, the harvested energy may be captured and stored in the sensor device 200.

After energy-collection sub-module 210 collects harvested energy, the energy is converted into electrical form within the energy-conversion sub-module 215. In some embodiments, energy-conversion sub-module 215 includes a piezoelectric element which translates the harvested energy into electrical form.

Because the power supply of sensor device 200 relies primarily on harvested energy, the power requirement of the sensor device 200 therefore may be relatively low. The power requirement of sensor devices consistent with the present disclosure may be on the order of nanowatts or milliwatts. In some implementations, sensor device 200 includes a super-capacitor 220 which stores the converted energy.

Figure 3:
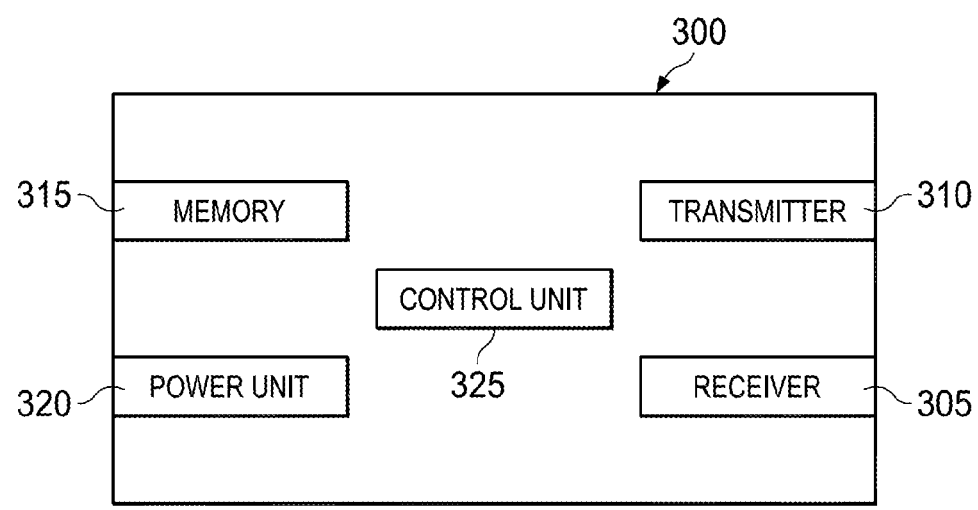
FIG. 3 is a block diagram representing an aggregator device consistent with the present disclosure.

FIG. 3 is an illustration of an exemplary aggregator device 300 consistent with the present disclosure. Aggregator device 300 communicates with the network of devices via a wireless interface such as Bluetooth, NFC, Wi-Fi, Zigbee, etcetera. To facilitate communication, aggregator device 300 includes a receiver 305. In particular, receiver 305 may "listen" over a wireless network for electrical signals emitted by wireless-communication-enabled devices within a network. In some embodiments, receiver 305 detects each occurrence of an electrical signal emission (e.g., "chirp") by the wireless-communication-enabled devices within the network. As such, any receiver which enables the aggregator device 300 to detect electrical signals emitted by wireless-communication-enabled devices is within the spirit and scope of the present disclosure.

In addition, aggregator device 300 includes a transmitter 310 to transmit electrical signals to devices within a network. As such, transmitter 310 may communicate messages to the wireless-communication-enabled devices. Particularly, transmitter 310 may request information from any device within a wireless network. For instance, if the devices within the network function primarily for monitoring (e.g., vibration, motion thermal, and light detection), the transmitter 310 may be directed by control unit (which includes logic) 325 having instructions to request monitoring data from each device on demand.

Transmitter 310 may also transmit information to an external device. For example, transmitter 310 may transmit the number of communication occurrences to an external device via a wireless transmission. The external device may include any of a mobile phone, computing tablet, or personal computer (PC). Transmitter 310 may transmit information regarding each occurrence of an emitted electrical signal from the wireless-communication-enabled devices within a network.

Most notably, control unit logic 325 includes instructions to tally the number of electrical signals emitted from each wireless-communication-enabled device within the network. Control unit logic 325 may record each occurrence of an emitted electrical signal from the wireless-communication-enabled devices within a network. Furthermore, control unit logic 325 includes instructions to respond to a request such as from wireless-communication-enabled devices within the network.

In addition, in the embodiment shown, aggregator device 300 includes memory 315 and power unit 320. Memory 315 may be used to record each occurrence (or aggregate) of emitted electrical signals from the wireless-communication-enabled devices such that such data can be produced at a later time upon request. Particularly, memory 315 records each occurrence (or aggregate) of an emitted electrical signal for each wireless-communication-enabled device.

A power unit 320 which may be electrically coupled to the receiver 305, transmitter 310, memory 315, and control unit logic 325. In one implementation, power unit 320 is coupled to an external alternating current (AC) power supply. In the embodiment shown, aggregator device 300 comprises a housing 301 which encloses receiver 305, transmitter 310, memory 315, power unit 320, and control unit logic 325.

Figure 4:
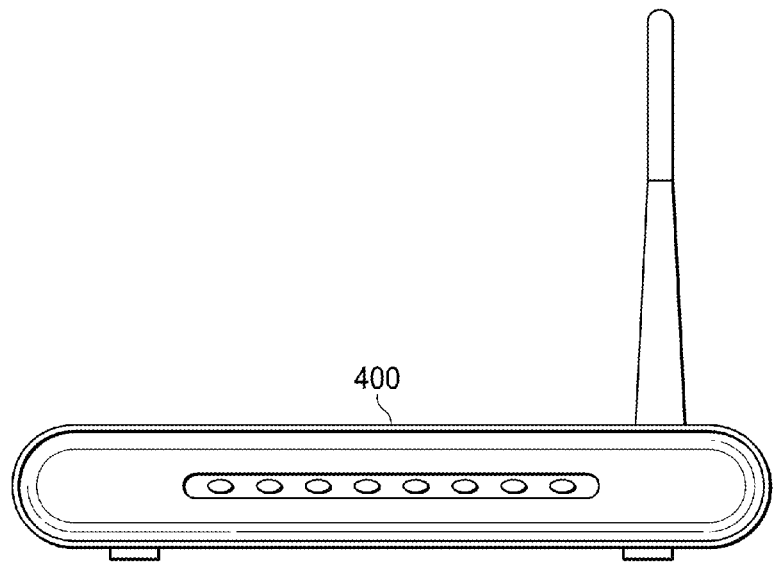
FIG. 4 is an illustration of an exemplary aggregator device having wireless router capability.

FIG. 4 is an illustration of an exemplary aggregator device 400 having wireless router capability. Advantageously, aggregator device 400 includes router architecture to forward packets of information between devices within a network. In one implementation of the present disclosure, the router architecture includes functionality to communicate with network devices.

In some implementations, aggregator device 400 includes control unit logic that includes instructions to tally the number of electrical signals emitted from each wireless-communication-enabled device; instructions to record each occurrence of an emitted electrical signal from the wireless-communication-enabled devices; and instructions to respond to a request. In particular, aggregator device 400 includes control unit logic consistent with the control unit logic shown in FIG. 3. In addition, aggregator device 400 may be on a wireless network which can transmit information (e.g., regarding "chirps" from network of wireless-communication-enabled device) to a computing system (e.g., mobile phone, laptop, or Personal Computer).

Figure 5:
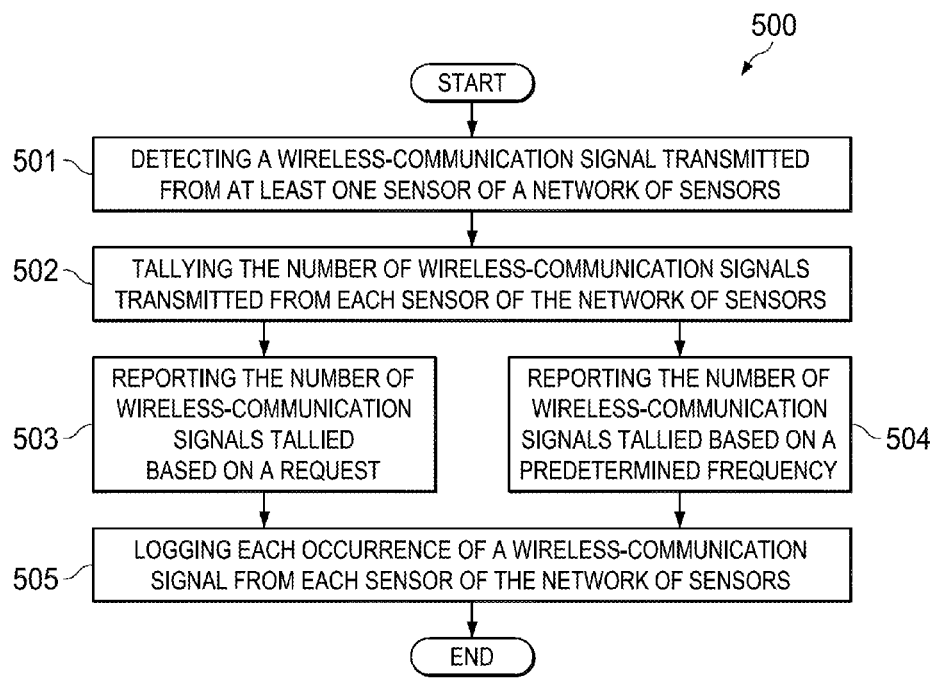
FIG. 5 is a flowchart of a method for logging and reporting electrical signals emitted from the wireless-communication-enabled devices.

FIG. 5 is a flowchart 500 of a method for logging and reporting electrical signals emitted from the wireless-communication-enabled devices. Flowchart 500 begins with block 501, detecting a wireless communication (e.g., signal) transmitted from at least one sensor of a network of sensors. In some embodiments, the wireless communication may be an emitted electrical signal (e.g., "chirp"). After a wireless communication is detected, block 502 provides the following—tallying the number of a wireless communications transmitted from each sensor of the network of sensors. In some embodiments, an aggregator device as described in the present disclosure tallies the number of wireless communications transmitted from each sensor of a network of sensors.

Next, reporting the number of wireless communications tallied based on a request—block 503. In particular, an aggregator device consistent with the present disclosure may report, upon request, the tallied data to a computing system (e.g., mobile phone, laptop computer, Personal Computer). Alternatively, the number of wireless communications may be tallied based on a predetermined frequency (block 504).

Lastly, block 505 provides logging each occurrence of a wireless communication from each sensor of the network of sensors (block 505). Accordingly, an aggregator device may record each occurrence of detected wireless communications for a span of days, weeks, etcetera according to its configuration and storage capacity.

Figure 6:
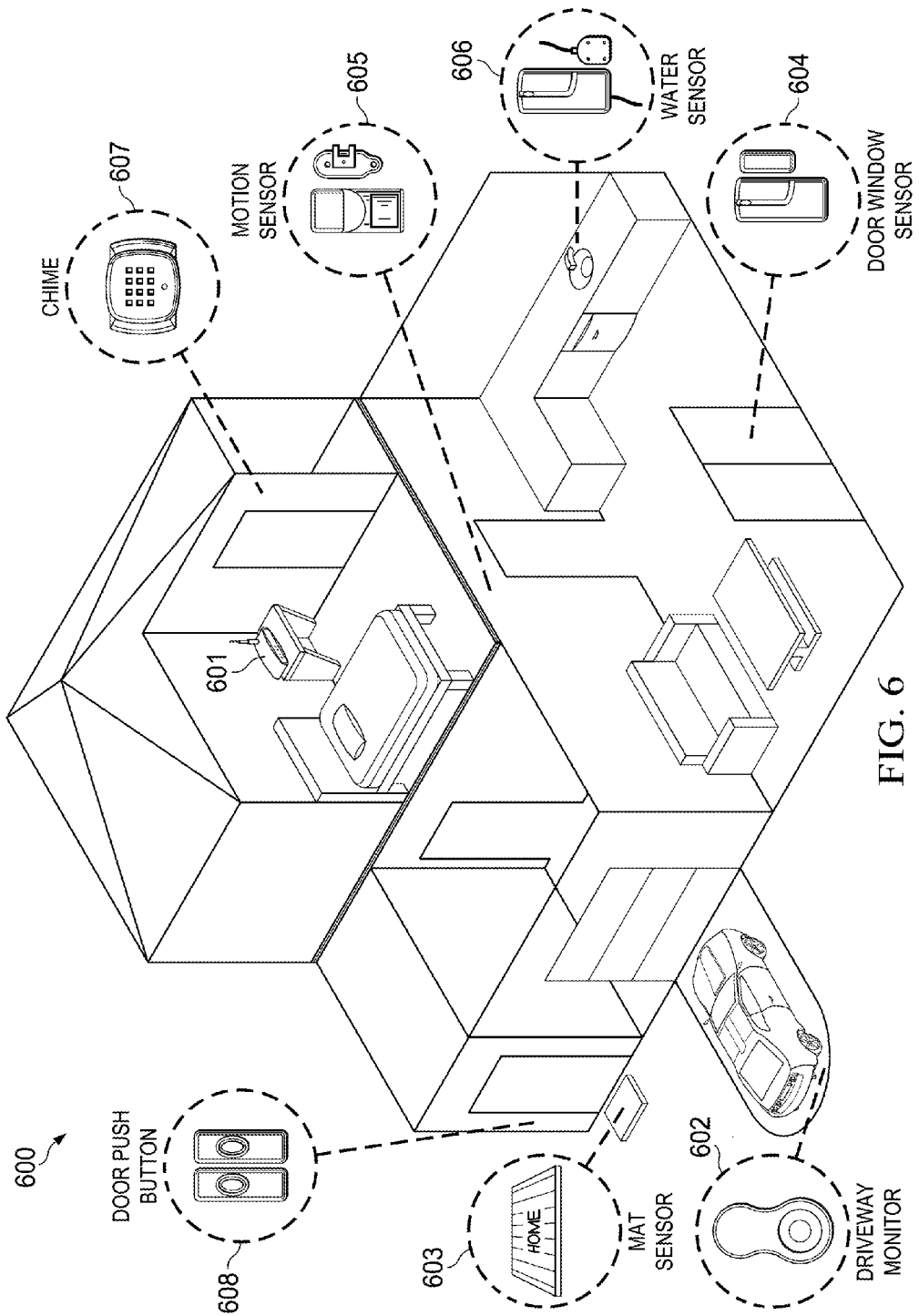
FIG. 6 is a diagram illustrating a network of wireless-communication-enabled devices distributed throughout a home and communicatively coupled to an aggregator device.

FIG. 6 is a diagram illustrating a network of wireless-communication-enabled devices distributed throughout a home 600 and communicatively coupled to an aggregator device 601 therein. As shown in the figure, the present disclosure may be implemented in a home such that a plurality of wireless-communication-enabled devices, monitoring various conditions within the home, are reported to an aggregator device which may be located near the center inside of the home.

In the figure, the home 600 has a driveway sensor 602, doormat sensor 603, door window monitor 604, motion detector 605, water sensor 606, chime sensor 607, and door push button sensor 608. It should be appreciated, however, that many other sensors may be distributed throughout the home 600 and that the present disclosure is not limited to those shown in the figure.

Furthermore, wireless-communication-enabled devices may not only be embedded in or coupled to fixtures within a home. For example, wireless-communication-enabled devices may be coupled to items that are moved in the home such as key sets, footwear, jewelry, etcetera.

In addition, the present disclosure is not limited to a single aggregator device within a home, office, or an enclosed environment. As such, a network of aggregator devices may be used to within a single home, office, etcetera. For example, an office may have an aggregator device in different wings to monitor a particular set of wireless-communication-enabled devices. In this example, the office may have a "master aggregator device" to receive communication from each "slave aggregator device" such that the master aggregator device receives communications from each wireless-communication-enabled device within the office. Accordingly, an operator may receive monitoring updates from the master aggregator device or from each respective slave aggregator device.

Figure 7:
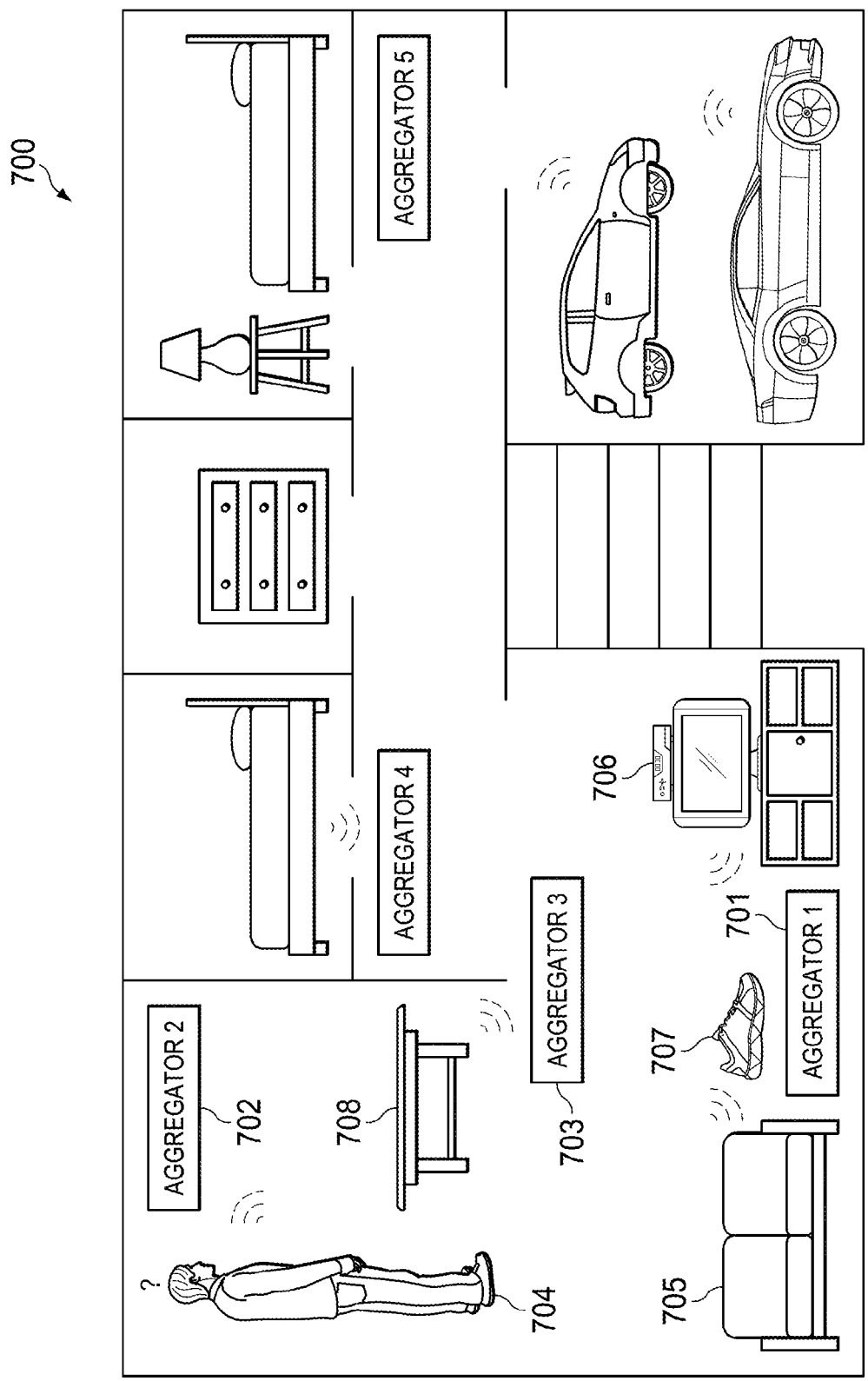
FIG. 7 is a diagram illustrating a network of aggregator devices distributed throughout a home.

FIG. 7 is a diagram illustrating a network of aggregator devices distributed throughout a home 700. In the figure, a homeowner 704 is shown looking for a lost shoe 707, having a wireless-communication-enabled device (not shown) embedded therein, within the home 700 equipped with the network of aggregator devices. As shown, homeowner 704 is near table 708 looking for the lost shoe 707. Unfortunately, homeowner 704 is looking for the lost shoe 707 in the wrong place since the lost shoe 707 is between the loveseat 705 and the television 706.

The network of aggregator devices within the home 700 include Aggregator device 1 (701), Aggregator device 2 (702), Aggregator device 3 (703), and Aggregator device 4. In particular, Aggregator devices 1, 2, and 3 are in the living room area. Because the living room area has three aggregator devices (i.e., 701-703 therein, homeowner 704 can request from of the aggregator devices 701, 702 to communicate the last detected location of the lost shoe 707.

In one other implementation, a home may have several aggregator devices distributed throughout the home so that any emitted electrical signal is detected by at least one aggregator device. For example, a sensor may be embedded in a homeowner's shoe. If the shoe is ever in motion (e.g., when being worn) in the home, the sensor may chirp on a predetermined frequency (e.g., once per second or each step). At least one or more of the aggregator devices within the home should detect the chirp and record a timestamp of the event. Accordingly, triangulation location techniques may be implemented by the aggregator devices to locate the lost shoe within the home.

This disclosure pertains to Internet of Things (IoT) systems, and in particular (but not exclusively) to logging random "chirps" of IoT devices and rebroadcasting these chirps to other devices on demand. It will be understood by those having ordinary skill in the art that the present disclosure may be embodied in other specific forms without departing from the spirit and scope of the disclosure disclosed. In addition, the examples and embodiments described herein are in all respects illustrative and not restrictive. Those skilled in the art of the present disclosure will recognize that other embodiments using the concepts described herein are also possible.

What is claimed is:

1. An apparatus, comprising:
a master aggregator, comprising:
a transmitter to communicate with a network of slave aggregator devices, wherein the network of slave aggregator devices includes multiple slave aggregator devices that monitor a network of wireless-communication-enabled devices;
a receiver to receive detected communications transmitted from the network of slave aggregator devices;
control unit logic to tally a number of electrical signals emitted from the network of wireless-communication-enabled devices;
aggregator logic communicatively coupled to the network of slave aggregator devices, the aggregator logic to execute instructions to aggregate a number of communication occurrences from each wireless-communication-enabled device of the network of wireless-communication-enabled devices;
memory to store the number of emitted electrical signals; and
a power unit electrically coupled to the transmitter, receiver, and memory.

2. The apparatus of claim 1 further comprising logic to execute instructions to record each occurrence of an emitted electrical signal from the wireless-communication-enabled devices.

3. The apparatus of claim 1 further comprising logic to execute instructions to respond to a request.

4. The apparatus of claim 1, wherein the transmitter is to transmit the number of communication occurrences to an external device via a wireless transmission.

5. The apparatus of claim 4, wherein the external device includes at least one of a mobile phone, computing tablet, or personal computer (PC).

6. The apparatus of claim 1, wherein the network of wireless-communication-enabled devices includes sensors.

7. The apparatus of claim 1 further comprising a housing to enclose the transmitter, receiver, logic, memory and power unit.

8. The apparatus of claim 1, wherein the power unit is coupled to an alternating current (AC) power supply.

9. A system, comprising:
a network of sensors, each sensor comprising:
an energy collection sub-module to collect ambient energy;
an energy conversion sub-module to transform the ambient energy into electrical form; and
a wireless transmission sub-module to transmit a signal according to a predetermined frequency or in response to an event; and
an aggregator module communicatively coupled to a network of slave aggregator devices, wherein the aggregator module is to execute instructions to aggregate a number of signal occurrences from each sensor, wherein the network of slave aggregator devices includes multiple slave aggregator devices that monitor the network of sensors.

10. The system of claim 9, wherein the ambient energy collected by the energy collection module includes at least one of thermal energy, mechanical energy, light energy, and natural energy.

11. The system of claim 9, wherein the energy conversion module includes a piezoelectric element to translate the ambient energy into electrical form.

12. The system of claim 9, wherein at least one of the network of sensors transmits a signal when the at least one sensor detects at least one of vibration, motion, light, and thermal energy.

13. The system of claim 9, wherein the network of sensors are distributed throughout a building.

14. The system of claim 13, wherein at least one of the network of sensors are coupled to a window, coupled to a door, or embedded within a wall of the building.

15. The system of claim 9 further comprising a supercapacitor, coupled to each sensor, to collect the ambient energy.

16. A non-transitory computer readable medium including code, when executed, to cause a machine to:
use a network of slave aggregators devices to detect a wireless communication transmitted from a network of sensors, wherein the network of slave aggregator devices includes multiple slave aggregator devices that monitor the network of sensors;
send the wireless communication from the network of slave aggregators devices to a master aggregator;
use the master aggregator to tally a number of wireless communications transmitted from each sensor of the network of sensors; and
report the number of wireless communications tallied based upon a request.

17. The non-transitory computer readable medium of claim 16 further comprising code, when executed, to cause a machine to log each occurrence of a wireless communication from each sensor of the network of sensors.

18. The non-transitory computer readable medium of claim 16 further comprising code, when executed, to cause a machine to report the number of wireless communications based on a predetermined frequency.

19. The non-transitory computer readable medium of claim 16, wherein the number of wireless communications are tallied for a predetermined time period.

20. The non-transitory computer readable medium of claim 16, wherein the number of wireless communications tallied are reported to a mobile device via a Wi-Fi network.

* * * * *